United States Patent
Johnson et al.

(10) Patent No.: US 9,085,474 B2
(45) Date of Patent: Jul. 21, 2015

(54) MODULAR SYSTEM FOR STORM WATER AND/OR WASTE WATER TREATMENT

(71) Applicants: Michael M. Johnson, Redmond, WA (US); Jessica Minger, Seattle, WA (US); Donald Shride, Port Orchard, WA (US)

(72) Inventors: Michael M. Johnson, Redmond, WA (US); Jessica Minger, Seattle, WA (US); Donald Shride, Port Orchard, WA (US)

(73) Assignee: Lean Environment Inc., Tacoma, WA (US)

( * ) Notice: Subject to any disclaimer, the term of this patent is extended or adjusted under 35 U.S.C. 154(b) by 173 days.

(21) Appl. No.: 13/729,362

(22) Filed: Dec. 28, 2012

(65) Prior Publication Data

US 2014/0183111 A1    Jul. 3, 2014

(51) Int. Cl.
| | |
|---|---|
| C02F 1/28 | (2006.01) |
| B01D 24/14 | (2006.01) |
| E03F 5/10 | (2006.01) |
| C02F 101/20 | (2006.01) |
| C02F 103/00 | (2006.01) |

(52) U.S. Cl.
CPC ............... *C02F 1/286* (2013.01); *B01D 24/14* (2013.01); *E03F 5/105* (2013.01); *C02F 1/281* (2013.01); *C02F 2101/20* (2013.01); *C02F 2103/001* (2013.01); *C02F 2201/007* (2013.01); *C02F 2209/03* (2013.01); *C02F 2301/08* (2013.01)

(58) Field of Classification Search
CPC ............ C02F 1/281; C02F 1/286; C02F 1/62; C02F 2101/20; C02F 2103/001; C02F 2201/007; C02F 2209/42; C02F 2301/08; C02F 2209/03; B01D 24/14; B01D 24/24; B01D 2201/48; B01D 2221/12; B01D 35/26; B01D 35/303; B01D 37/045; B01D 2101/00; B01D 2101/04; E03F 5/105
USPC ................. 210/109, 116, 252, 255, 258, 289
See application file for complete search history.

(56) References Cited

U.S. PATENT DOCUMENTS

| | | | |
|---|---|---|---|
| 624,985 | A | 5/1899 | Scott-Moncrieff |
| 732,208 | A | 5/1901 | Mitchell |
| 681,884 | A | 9/1901 | Monjeau |
| 1,573,929 | A | 2/1926 | Gall |

(Continued)

FOREIGN PATENT DOCUMENTS

| | | |
|---|---|---|
| CA | 2247135 | 8/2006 |
| CN | 101671066 | 9/2011 |

(Continued)

OTHER PUBLICATIONS

Chen; Electrochemical Technologies in Wastewater Treatment; www.sciencedirect.com; Oct. 13, 2003; 41 pages.

*Primary Examiner* — Matthew O Savage
(74) *Attorney, Agent, or Firm* — Jensen and Puntigam, P.S.

(57) ABSTRACT

The waste water/storm water treatment system includes a plurality of treatment modules, each of which includes upper and lower tank members. Each tank includes an inlet with a spray bar at the upper end thereof, and a drainage member at the lower end thereof. Treated water moves from the drainage member in the upper tank through an inlet at the top of the lower tank. The outlet member of the lower tank is connected to a pump which is controlled by a switch, to move water to the next module in the system or to the drainage system. The tanks have metal-adsorbing inorganic media or agricultural media positioned therein, such as activated rice hulls, corn cobs and the like for adsorbing metals in the storm water/waste water.

15 Claims, 4 Drawing Sheets

(56) References Cited

U.S. PATENT DOCUMENTS

| | | | |
|---|---|---|---|
| 1,902,171 | A | 3/1933 | Kopp |
| 2,222,310 | A | 11/1940 | Emery |
| 2,463,464 | A | 3/1949 | Lind |
| 3,128,354 | A * | 4/1964 | Conery .................. 200/83 R |
| 3,577,678 | A | 5/1971 | Burton |
| 3,770,623 | A | 11/1973 | Seidel |
| 3,817,864 | A | 6/1974 | Carlson et al. |
| 3,894,355 | A | 7/1975 | Carothers |
| 4,031,009 | A | 6/1977 | Hicks |
| 4,098,695 | A * | 7/1978 | Novotny .................. 210/85 |
| 4,162,976 | A | 7/1979 | Monson |
| 4,293,421 | A | 10/1981 | Green |
| 4,415,450 | A | 11/1983 | Wolverton |
| 4,715,958 | A | 12/1987 | Fuchs |
| 4,824,572 | A | 4/1989 | Scott |
| 4,839,051 | A | 6/1989 | Higa |
| 4,855,040 | A | 8/1989 | Kikuth |
| 4,995,969 | A | 2/1991 | LaVigne |
| 4,997,568 | A | 3/1991 | Vandervelde et al. |
| 5,030,353 | A | 7/1991 | Struth |
| 5,073,257 | A | 12/1991 | Higa |
| 5,269,094 | A | 12/1993 | Wolverton et al. |
| 5,273,653 | A | 12/1993 | Kikuth |
| 5,281,332 | A | 1/1994 | Vandervelde et al. |
| 5,322,629 | A | 6/1994 | Stewart |
| 5,352,357 | A | 10/1994 | Perry |
| 5,437,786 | A | 8/1995 | Horsley et al. |
| 5,486,291 | A | 1/1996 | Todd et al. |
| 5,549,817 | A | 8/1996 | Horsley et al. |
| 5,624,576 | A | 4/1997 | Lenhart et al. |
| 5,626,644 | A | 5/1997 | Northrop |
| 5,632,889 | A | 5/1997 | Tharp |
| 5,632,896 | A | 5/1997 | Vandervelde et al. |
| 5,636,472 | A | 6/1997 | Spira et al. |
| 5,637,218 | A | 6/1997 | Kikuth |
| 5,690,827 | A | 11/1997 | Simmering et al. |
| 5,695,651 | A | 12/1997 | Froud |
| 5,702,593 | A | 12/1997 | Horsley et al. |
| 5,707,513 | A | 1/1998 | Jowett et al. |
| 5,707,527 | A | 1/1998 | Knutson et al. |
| 5,714,077 | A | 2/1998 | Brown et al. |
| 5,733,453 | A | 3/1998 | DeBusk |
| 5,744,048 | A | 4/1998 | Stetler |
| 5,770,057 | A | 6/1998 | Filion |
| 5,804,081 | A | 9/1998 | DeGesero et al. |
| 5,810,510 | A | 9/1998 | Urriola |
| 5,863,433 | A | 1/1999 | Behrends |
| 5,868,943 | A | 2/1999 | Donnelly, Jr. |
| 5,897,777 | A | 4/1999 | Zoeller et al. |
| 6,024,870 | A | 2/2000 | Thompson |
| 6,027,639 | A | 2/2000 | Lenhart, Jr. et al. |
| 6,277,274 | B1 | 8/2001 | Coffman |
| 6,322,699 | B1 | 11/2001 | Fernandez |
| 6,337,025 | B1 | 1/2002 | Clemenson |
| 6,350,374 | B1 | 2/2002 | Stiver et al. |
| 6,428,691 | B1 | 8/2002 | Wofford |
| 6,467,994 | B1 | 10/2002 | Ankeny et al. |
| 6,531,062 | B1 | 3/2003 | Whitehill |
| 6,554,996 | B1 | 4/2003 | Rebori |
| 6,569,321 | B2 | 5/2003 | Coffman |
| 6,592,761 | B2 | 7/2003 | Wofford |
| 6,638,424 | B2 | 10/2003 | Stiver et al. |
| 6,649,048 | B2 | 11/2003 | deRidder et al. |
| 6,652,743 | B2 | 11/2003 | Wallace et al. |
| 6,719,910 | B1 | 4/2004 | Thiem et al. |
| 6,905,599 | B2 | 6/2005 | Allard |
| 6,919,033 | B2 | 7/2005 | Stark et al. |
| 7,001,527 | B2 | 2/2006 | Stiver et al. |
| 7,014,755 | B2 | 3/2006 | Muir et al. |
| 7,080,480 | B2 | 7/2006 | Urban et al. |
| 7,081,203 | B2 | 7/2006 | Helm |
| 7,105,086 | B2 | 9/2006 | Saliba |
| 7,118,306 | B2 | 10/2006 | Kruger et al. |
| 7,182,856 | B2 | 2/2007 | Pank |
| 7,214,311 | B2 | 5/2007 | Aberle et al. |
| 7,378,021 | B2 | 5/2008 | Austin et al. |
| 7,419,591 | B2 | 9/2008 | Aberle et al. |
| 7,425,261 | B2 | 9/2008 | Siviter et al. |
| 7,470,362 | B2 | 12/2008 | Kent |
| 7,625,485 | B2 | 12/2009 | Siviter et al. |
| 7,638,065 | B2 | 12/2009 | Stiver et al. |
| 7,674,378 | B2 | 3/2010 | Kent |
| 7,754,072 | B2 | 7/2010 | Kelly et al. |
| 7,776,217 | B2 | 8/2010 | Lucas |
| 7,784,217 | B2 | 8/2010 | SanSolo et al. |
| 7,799,235 | B2 | 9/2010 | Olson et al. |
| 7,967,979 | B2 | 6/2011 | Srewal et al. |
| 8,048,303 | B2 | 11/2011 | Lucas |
| 8,110,105 | B2 | 2/2012 | Allen, II et al. |
| 8,157,991 | B2 | 4/2012 | Wilhelms et al. |
| 2005/0205479 | A1 * | 9/2005 | Sharir .................. 210/121 |
| 2008/0017566 | A1 * | 1/2008 | Hill .................. 210/295 |
| 2009/0101555 | A1 * | 4/2009 | Scarpine et al. ......... 210/170.03 |
| 2011/0226615 | A1 | 9/2011 | Bakhir |

FOREIGN PATENT DOCUMENTS

| | | |
|---|---|---|
| GB | 2500663 | 10/2013 |
| JP | 200843891 | 2/2008 |

* cited by examiner

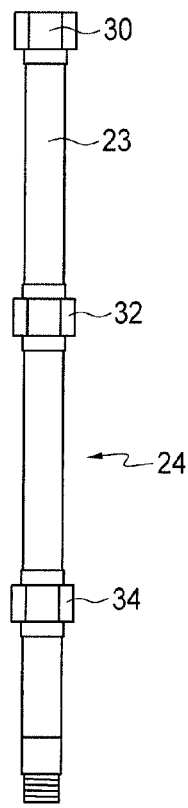
FIG. 3
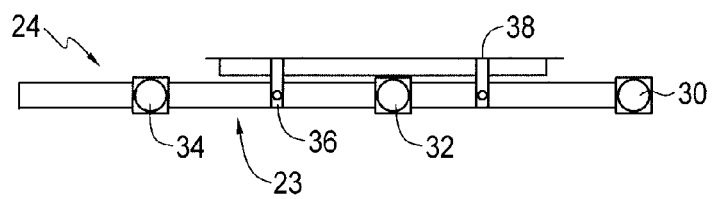
FIG. 3A
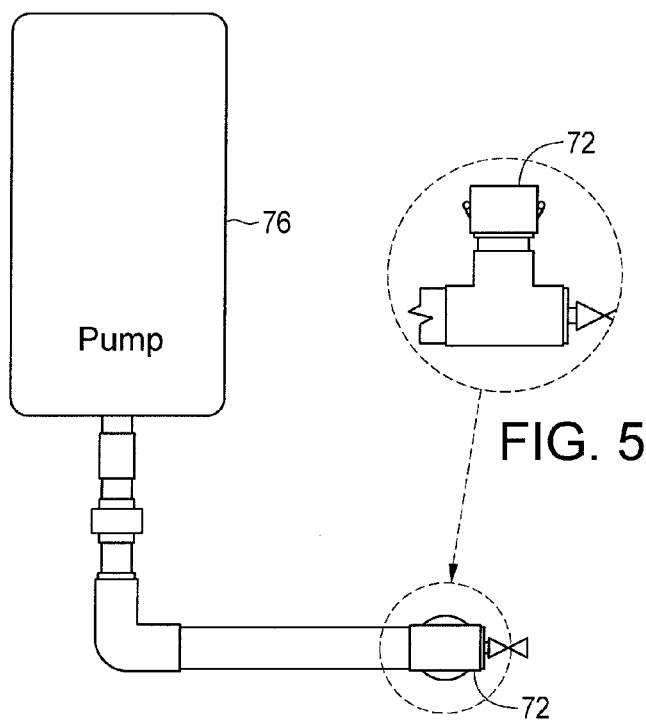
FIG. 5
FIG. 5A

US 9,085,474 B2

MODULAR SYSTEM FOR STORM WATER AND/OR WASTE WATER TREATMENT

TECHNICAL FIELD

This invention relates generally to storm water and/or waste water treatment systems, and more particularly concerns a modular system for removal of metals from storm water and/or waste water.

BACKGROUND OF THE INVENTION

Storm water generally refers to water which is generated from precipitation events, while waste water generally concerns water which is generated directly from industrial activity. In both cases, dissolved and suspended heavy metal pollutants are typically present in the water. Both storm water and waste water are discharged to various locations, including sewers, surface discharges such as a ditch, stream or other body or water, or a storm sewer, deep well injection or an infiltration system such as in a detention pond or dry well.

The heavy metals typically present in storm water or waste water, including lead, zinc and copper, are known to have undesirable effects on the environment. As a result, environmental regulatory agencies often place strict limits on the levels of these metals that may be discharged from human activities, such as industrial facilities, as well as public and commercial operations. Current limits for metals in storm water can be as low as 0.014 mg per liter for copper, 0.087 mg per liter for lead and 0.117 mg per liter for zinc, depending on the individual state.

Rainwater is mildly acidic due to the dissolution of carbon dioxide to form carbonic acid. The solubility of metals increases with decreasing pH. As a result, metals exposed to storm water, such as metal fences, can leach directly from the metallic form. As a result, any metal exposure to rainwater can lead to levels of dissolved metals in excess of regulatory limits.

Various techniques have been used for treatment of storm water and waste water, including sedimentation, filtration and constructed wetlands. These usually include a vault-like structure and require significant construction and real estate for implementation. Other techniques include electro-coagulation, adsorption or precipitation. Traditional ion exchange technology has also been employed for the treatment of heavy metals in storm water. All of these techniques, however, require relatively large capital investment, extensive sub-surface construction and/or significant square footage for successful results.

In summary, existing technology for treatment of storm water/waste water is expensive, requiring significant subsurface installation, large amounts of real estate and/or significant capital cost. These are significant constraints for many facilities and geographical areas, and thus make effective treatment of storm water/waste water either difficult or cost-prohibitive in many situations.

Accordingly, it is desirable to be able to reduce heavy metals present in storm water or waste water to acceptable levels, including convenient removal of metals from the dissolved liquid phase, transfer into a solid phase for disposal, recovery or further treatment. Further, it is desirable to have such a treatment system which requires little or no subsurface construction, is portable such that the system can be transported to various sites and can be arranged into a variety of configurations, while requiring less, even significantly less, physical space than existing treatment technologies.

SUMMARY OF THE INVENTION

Accordingly, a system for treatment of storm water and/or waste water to remove metals therein comprises: at least one treatment module which includes at least one tank member, wherein the tank member has an inlet near a top thereof, and an inlet member connected to the inlet positioned interiorly of the upper tank for releasing waste water into the tank, a drainage member at the bottom of the tank, and a pump/switch combination to move treated water from the drainage member of the tank in accordance with the level of water in the tank; and bio-sorbent material present in the tank for adsorbing metals from the storm water/waste water which passes through the tank by gravity or pump action.

BRIEF DESCRIPTION OF THE DRAWINGS

FIGS. 3 and 3A are plan and elevational views of a spray bar positioned at the top of each module section/tank.

FIGS. 5 and 5A are elevational and plan views of the pump and connecting structure to the lower portion of each module.

BEST MODE FOR CARRYING OUT THE INVENTION

Figure 1:
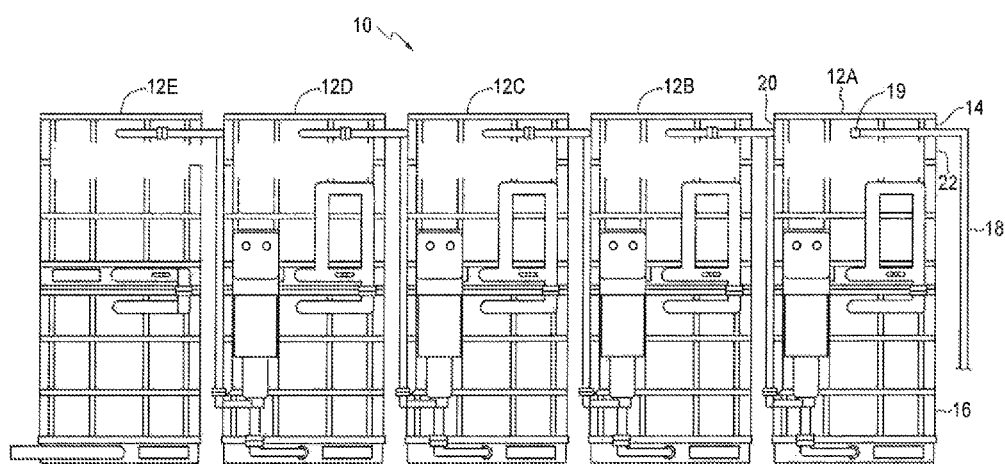
FIG. 1 shows an embodiment of the present treatment system, including five separate modules which are arranged in series.
Figure 2:
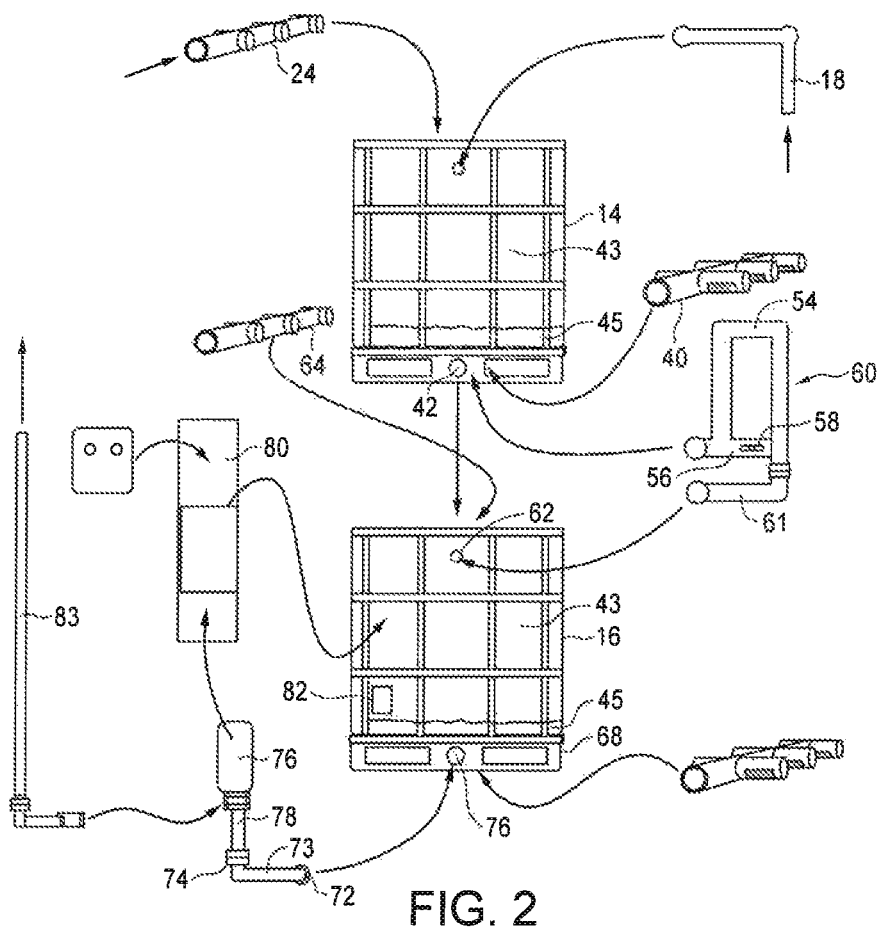
FIG. 2 is an exploded view of one module of FIG. 1.
Figure 4:
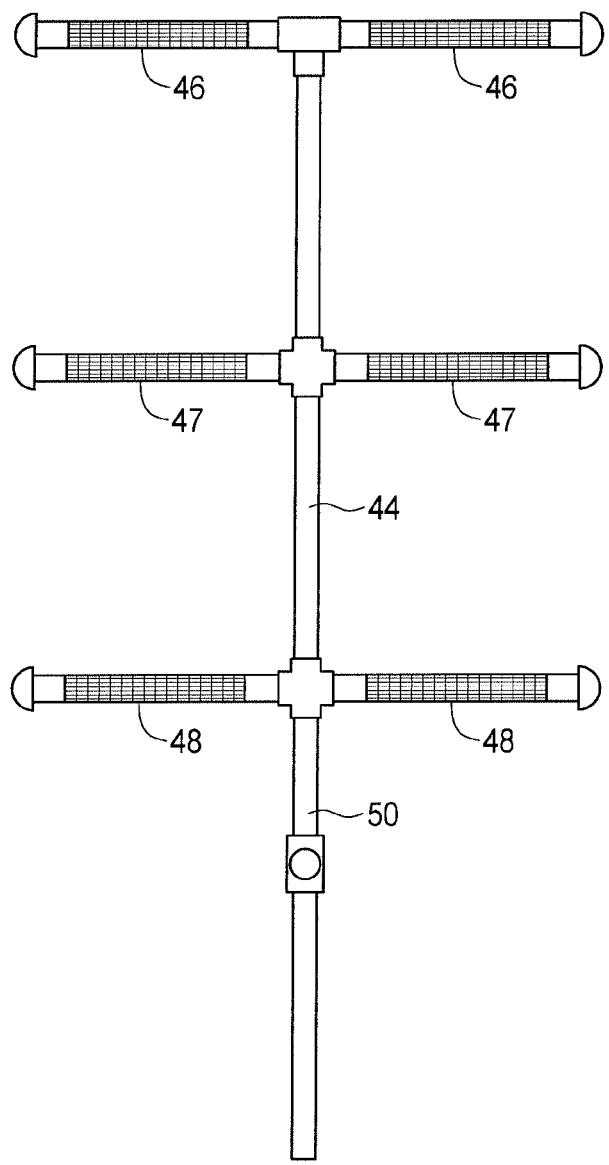
FIGS. 4 and 4A are plan and elevational views of a drainage member positioned at the lower end of each tank.
Figure 4A:
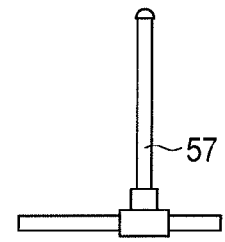

FIG. 1 shows a storm water treatment system, also referred to as a waste water treatment system, generally at 10. The storm water treatment system 10 includes a plurality of separate modules 12A-12E. The storm water treatment system can include different numbers of connected modules 12, typically anywhere from two or in some cases one, to four or more, depending on the application. Each module is identical, comprising separate upper and lower identical tanks 14 and 16 in the embodiment shown. In another embodiment, only one tank comprises a module. In the embodiment shown, each tank is approximately 3½ feet high and 40×40 inches in cross-section, although this can vary. In another embodiment, the tank could be 40×56 inches in cross-section, for instance. In the embodiment shown, each tank holds 275 gallons of liquid, although again this can vary. Each comprises a heavy-duty plastic shell, supported by a steel frame and encased in polyolefin wrapping.

The first module 12A includes an input line 18. The storm water will typically be pumped from a catch basin which includes a submerged pump (not shown). The storm water will thus be pumped into the top of the upper tank 14 of the first module, through the inlet line 18 connected to inlet 19. Inlet 19 typically is close to the top of the upper tank 14, midway between the two sides 20 and 22 thereof. Present in the upper tank is a tank spray bar 24 (FIGS. 3, 3A). The spray bar 24 in the embodiment shown screws into inlet 19 and includes a center member of PVC pipe 23 approximately 1½ inches in diameter and 36 inches long. The spray bar also includes three spray members 30, 32 and 34 located, respectively, in the embodiment shown at (1) the distal end of the spray bar, (2) approximately midway of the spray bar and (3) in the vicinity of the proximal end of the spray bar, approximately four inches from inlet 19. Each spray member includes openings through which storm water is dispersed horizontally in opposing directions from the center member. The spray bar 24 is supported to the top of the tank by a pair of brackets 36 and 38.

Positioned in the tank 14 is the media 43 for treatment of the storm water. The media is bio-sorbent material, typically agricultural, cellulose products. Alternatively, or in combination with the agricultural material, naturally occurring or manufactured inorganic adsorbent material may be used. The cellulosic material could be activated rice hulls, for instance, or other biosorbant material, including corn cobs, soy beans, straw or even spent hops, among other possibilities. The necessary physical properties are that such biosorbant material resists rotting and that it adsorbs metals in the storm water. The bio-sorbent material could also be limestone, pumice or other mineral products capable of adsorbing metals from storm water. The activated media will typically extend for approximately the full height of the tank. At the bottom of the upper tank 14 is a small layer 45, for instance two inches or so, of sand, pumice or other nonactive inert material.

Located near the lower end of upper tank 14 is a drainage member 40. The drainage member allows water to be drained from each tank without allowing media or other large material leaving the upper tank. Drainage member 40 is connected to a discharge or outlet 42 at the bottom of each tank. The drainage member comprises an elongated PVC center member 44, approximately 1½ inches in diameter and approximately 36 inches long. Extending from the center member are 3 pairs of opposing PVC drainage arms 46-48, located, respectively, at (1) the distal end of the center member 44, (2) approximately midway of the center member and (3) at the proximal end of the center member. Each drainage arm is approximately 1½ inches in diameter and 7 inches long. The drainage arms are slotted and/or mesh-wrapped so as to prevent media and large material from leaving the tank, while allowing treated water to pass through. The arms 48-48 are located approximately four inches from the outlet, although that can be varied. Water drains out, by gravity, through outlet 42. An overflow pipe 57 is positioned at the outlet of the upper tank, outside of the tank. The overflow pipe in the embodiment shown is a capped PVC pipe 1½ inches in diameter and approximately 28 inches high, although this can be varied. The overflow pipe is not shown in FIG. 1.

From outlet 42, water flows through a connecting member 60. Connecting member 60 includes an upside down U-shaped section 54 which extends upwardly close to the exterior surface of the tank, with the lower end of section 54 being connected by a bridge line 56 which extends between the two ends of section 54. Positioned in bridge line 56 is a valve 58. Extending from one leg of section 54 is a connecting line 61 to inlet 62 at the top of lower tank 16, which is substantially identical to upper tank 14. Connected to inlet 62 is a spray bar 64 identical to spray bar 24 in the upper tank. The lower tank is also filled with the media similar to or different from (but functionally the same) that of upper tank 14. At the lower end 68 of lower tank 16 extending from outlet 70 is a cam lock 72 and connecting line 73 which extends to a union member 74. From the union member 74, a vertical line 75 extends to a pump 76. In the embodiment shown, the pump is a Dayton ⅓ HP single-phase 120-volt motor, although alternatives can be used. A controller 80 operates the pump. The pump controller and pump 76 are mounted on a panel, with the panel being mounted to the side of the tank by means of a pair of hooks. Controlling the on-off action of the pump is a pressure switch 82 which is located inside the lower tank. The pressure switch turns off the pump when there is no water pressure on the switch, and turns it on when there is approximately 10 inches of water above the switch. The pump remains on until the water reaches the level of the switch. The pump 76 moves the waste liquid from the bottom of the lower tank through a discharge pipe 83 into the upper tank of the next module 12B in the treatment system. Each module will operate similarly to that described above, with water being treated in each module in turn until the last module is reached, at which point liquid is discharged from the module to a sewer, storm drain or collecting member.

As indicated above, the treatment system can comprise different numbers of modules, with the efficiency of metal removal increasing with each additional module. For instance, with four modules there will be at least a 93% efficiency. The typical capacity for handling waste water with the above system is approximately 35 gallons per minute. Typically, the active system will operate for 90 or more days. At the end of 90 days, the first module (12A) will be removed and each of the other modules will move up one in position, with a new module being inserted at the end of the line of modules in the system.

Accordingly, a storm water/waste water treatment system has been described which comprises an arrangement of treatment modules, each of which include upper and lower tanks which include bio-sorbent material, which in operation adsorbs metals from the waste water. At the end of the treatment system, removal of metals is up to 99% efficient. The system requires relatively little space compared to existing treatment systems and is relatively inexpensive to install and maintain, thus providing significant improvements over existing treatment systems. While the system has a primary use in storm water/waste water treatment, it also can be used in the form of pre treatment of water as well.

Although a preferred embodiment has been disclosed for purposes of illustration, it should be understood that various changes and modifications and substitutions could be made in the preferred embodiment without departing from the spirit of the invention as defined by the claims which follow.

What is claimed is:

1. A system for treatment of storm water and/or waste water to remove metals therein, comprising:
at least one vertically oriented treatment module which includes at least two tank members, comprising an upper tank member positioned on top of a lower tank member, wherein each module includes a connecting line assembly from an outlet of a upper tank to an inlet of the lower tank therebeneath, wherein each tank member has an inlet near a top thereof, and an inlet member connected to the inlet positioned interiorly of the tank member for releasing storm water and/or waste water into the tank members, a drainage member at the bottom of the lower tank member, and pump actuated by a switch to move treated water from the drainage member of the lower tank member in accordance with the level of water in the lower tank member; and
treatment media material present in the upper and lower tank members for adsorbing metals from the storm water and/or waste water which passes through the tank members by gravity or pump action.

2. The system of claim 1, including a plurality of modules, wherein the drainage water from a first module is directed to the upper tank member of a following module.

3. The system of claim 1, wherein the treatment media material comprises material which resists rotting and is a cellulosic agriculture product, including activated rice hulls, corn cobs, soy beans or straw.

4. The system of claim 1, wherein the treatment media material is an inorganic manufactured material, capable of adsorbing metals from storm water and/or waste water.

5. The system of claim 1, wherein the treatment media material is limestone, pumice, or other naturally occurring mineral product capable of adsorbing metals from storm water and/or waste water.

6. The system of claim 1, including a narrow filter layer at the lower end of the upper and lower tank members.

7. The system of claim 6, wherein the filter layer comprises a non-reactive inert material.

8. The system of claim 7, wherein the inert material comprises sand or pumice.

9. The system of claim 1, including at least four treatment modules connected in series, wherein the efficiency of metal removal is at least 70% from the system.

10. The system of claim 1, wherein each tank member has a capacity of 275 gallons or 330 gallons.

11. The system of claim 1, wherein the upper and lower tank members each include an inlet spray bar which comprises a central elongated hollow member and three spaced pairs of opposing spray outlets through which storm water and/or waste water is directed to the upper and then the lower tank members.

12. The system of claim 1, wherein the drainage member comprises a central elongated member and three spaced opposing sets of arms, each of which includes slot openings covered by a mesh to prevent media or material from passing therethrough.

13. The system of claim 1, wherein the switch includes a pressure switch located in the lower tank for controlling operation of the pump in accordance with selected pressure levels of liquid on the switch.

14. The system of claim 1, including a plastic overflow arm extending from the outlet of the upper tank member of each module.

15. The system of claim 1, wherein the connecting line assembly includes a valve therein for connecting the discharge of the upper tank member to the inlet of the lower tank member.

* * * * *